(12) United States Patent
Lin et al.

(10) Patent No.: US 8,391,188 B2
(45) Date of Patent: Mar. 5, 2013

(54) MOBILE STATION HANDOFF WITH FLEX DUPLEX CHANNEL ASSIGNMENT IN A WIRELESS COMMUNICATION NETWORK

(75) Inventors: Harn-Jier Lin, Lisle, IL (US); James S. Marin, Murphy, TX (US)

(73) Assignee: Motorola Mobility LLC, Libertyville, IL (US)

( * ) Notice: Subject to any disclaimer, the term of this patent is extended or adjusted under 35 U.S.C. 154(b) by 477 days.

(21) Appl. No.: 12/828,990

(22) Filed: Jul. 1, 2010

(65) Prior Publication Data

US 2011/0026485 A1  Feb. 3, 2011

Related U.S. Application Data

(60) Provisional application No. 61/229,762, filed on Jul. 30, 2009.

(51) Int. Cl.
*H04W 36/00* (2009.01)
(52) U.S. Cl. ............... 370/277; 455/437; 455/442
(58) Field of Classification Search ............... None
See application file for complete search history.

(56) References Cited

U.S. PATENT DOCUMENTS

| 5,285,447 | A * | 2/1994 | Hulsebosch | 370/332 |
|---|---|---|---|---|
| 6,690,936 | B1 * | 2/2004 | Lundh | 455/436 |
| 2003/0109257 | A1 * | 6/2003 | Nilsson et al. | 455/436 |
| 2003/0109284 | A1 * | 6/2003 | Akerberg et al. | 455/561 |
| 2005/0096034 | A1 | 5/2005 | Petermann | |
| 2006/0160550 | A1 * | 7/2006 | Edwards | 455/509 |
| 2006/0183482 | A1 | 8/2006 | Ueda | |
| 2006/0246911 | A1 | 11/2006 | Petermann | |
| 2008/0304404 | A1 | 12/2008 | Lu et al. | |
| 2011/0281588 | A1 * | 11/2011 | Choi et al. | 455/442 |

OTHER PUBLICATIONS

Scott Marin, "TSG-A IOSv5.1.1 VnV Ad Hoc, :IOSv5.1.1 VnV SF116, Flex duplex parameters," 3rd Generation Partnership Project (3GPP) Recommendation submitted Aug. 6, 2009, published within A S0014-D v2.0 on Sep. 10, 2009, with a cover page date of Aug. 2009, 66 pages.

Patent Cooperation Treaty, International Search Report and Written Opinion of the International Searching Authority for International Application No. PCT/US2010/041121, Feb. 8, 2011, 10 pages.

\* cited by examiner

*Primary Examiner* — Hassan Phillips
*Assistant Examiner* — Duc Duong

(57) ABSTRACT

Disclosed is a method for mobile station hard handoff from a source base station to a target base station of a Flex Duplex call in a CDMA wireless communication network that includes a step of establishing Flex Duplex capabilities of the mobile station. A next step includes sending the Flex Duplex capabilities of the mobile station to the target base station. A next step includes configuring the mobile station and the target base station for the handoff of the call using the Flex Duplex capabilities.

10 Claims, 7 Drawing Sheets

| 7 | 6 | 5 | 4 | 3 | 2 | 1 | 0 | Octet |
|---|---|---|---|---|---|---|---|---|

⋮

| FDC Length = 04H | | | | | | | | n+6 |
|---|---|---|---|---|---|---|---|---|
| FDC Band Class = <any value> | | | | FDC Forward Channel Frequency = <any value> | | | | n+7 |
| ... | | | | | | | | n+8 |
| FDC Reverse Channel Frequency = <any value> | | | | | | | | n+9 |
| ... | | | Reserved = 00000 | | | | | n+10 |

| 7 | 6 | 5 | 4 | 3 | 2 | 1 | 0 | Octet |
|---|---|---|---|---|---|---|---|---|

⋮

| 7 | 6 | 5 | 4 | 3 | 2 | 1 | 0 | |
|---|---|---|---|---|---|---|---|---|
| FDC Length = 04H ||||||||| n+10 |
| FDC Band Class = <any value> ||||| FDC Forward Channel Frequency = <any value> ||| n+11 |
| ... ||||||||| n+12 |
| FDC Reverse Channel Frequency = <any value> ||||||||| n+13 |
| ... ||| Reserved = 00000 ||||| n+14 |

| 7 | 6 | 5 | 4 | 3 | 2 | 1 | 0 | Octet |
|---|---|---|---|---|---|---|---|---|

⋮

| 7 | 6 | 5 | 4 | 3 | 2 | 1 | 0 | |
|---|---|---|---|---|---|---|---|---|
| FDC Length |||||||| 12 |
| FDC Band Class |||| FDC Forward Channel Frequency |||| 13 |
| ... |||||||| 14 |
| FDC Reverse Channel Frequency |||||||| 15 |
| ... |||| Reserved |||| 16 |

FIG. 6

MOBILE STATION HANDOFF WITH FLEX DUPLEX CHANNEL ASSIGNMENT IN A WIRELESS COMMUNICATION NETWORK

CROSS-REFERENCE TO RELATED APPLICATIONS

The present application claims priority to U.S. Provisional Patent Application 61/229,762, filed on Jul. 30, 2009.

FIELD OF THE INVENTION

The present invention relates generally to wireless radio communication and, in particular, to mobile station handoff in a wireless communication network.

BACKGROUND OF THE INVENTION

Mobile Assisted Handoff uses the fixed-duplexer spacing of paired forward and reverse communication channels, as is known for Code Division Multiple Access (CDMA) communication systems. A recent proposal (3GPP2 A.S0014-D v2.0 verification and validation version) uses a "Flex Duplex" capability where the paired forward and reverse CDMA communication channels are assigned in a non-fixed (i.e., flexible) duplexer spacing. With flexible duplexer spacing, any reverse CDMA channel from a band class can be coupled with any forward CDMA channel from that band class, or with a forward CDMA channel from another band class, subject to the capabilities of the mobile station (indicated by session attributes to the communication network). This also allows using a reverse CDMA channel from a paired spectrum with forward CDMA channels from both the paired spectrum as well as unpaired spectrum providing network operators with additional flexibility in spectrum allocation.

Unfortunately, CDMA-to-CDMA handoff time when using Flex Duplex is longer than necessary because the target base station is not informed of the forward and reverse channel assignment that is in use prior to the handoff. As a result, time is wasted sending target capabilities to the source base station that are not likely to be used during a handoff. In addition, time is wasted informing the source base station of a target base station's capability that, in some cases, has no chance for success. For example, the target base station could have determined, after receiving the handoff request message, that it does not support the handoff configuration of the currently in-use call and could have immediately rejected the handoff request. In addition, the CDMA-to-CDMA handoff success probability is lower than necessary.

Also, the time for the radio to synchronize may be reduced by assigning the currently in-use Flex Duplex Channel (FDC) for the handoff instead of picking a different set of channels for handoff. The time savings is due to avoiding the need to retune the radio channel and to avoiding the need to re-acquire synchronization. Also, by retaining the in-use Flex Duplex Channel during handoff, a known radio propagation condition is retained for the handoff procedure which would result in an improved handoff success rate.

One solution currently proposed in a cellular base station standard (to be published as 3GPP2 A.S0014-D v2.0) is for the target base station, during a handoff, to report its ability to support Flex Duplex. Specifically, Flex Duplex information is added to a Handoff Request Acknowledge message and to a Handoff Command message. The target base station, using the Handoff Request Acknowledge message, informs the source base station of the Flex Duplex capability of the target base station. The Flex Duplex capability is a list of forward and reverse channel pairs that the target base station supports. However, this solution does not address the Flex Duplex capabilities of the mobile station. In addition, this solution does not inform the target base station about the Flex Duplex capabilities presently in use for the communication to be handed off.

BRIEF SUMMARY

The above considerations, and others, are addressed by the present invention, which can be understood by referring to the specification, drawings, and claims. According to aspects of the present invention, a method for mobile station hard handoff from a source base station to a target base station of a Flex Duplex call in a CDMA wireless communication network includes a step of establishing Flex Duplex capabilities of the mobile station. A next step includes sending the Flex Duplex capabilities of the mobile station to the target base station. A next step includes configuring the mobile station and the target base station for the handoff of the call using the Flex Duplex capabilities.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

FIGS. 4 through 6 illustrate different tables of information elements, in accordance with the present invention.

DETAILED DESCRIPTION

Figure 1:
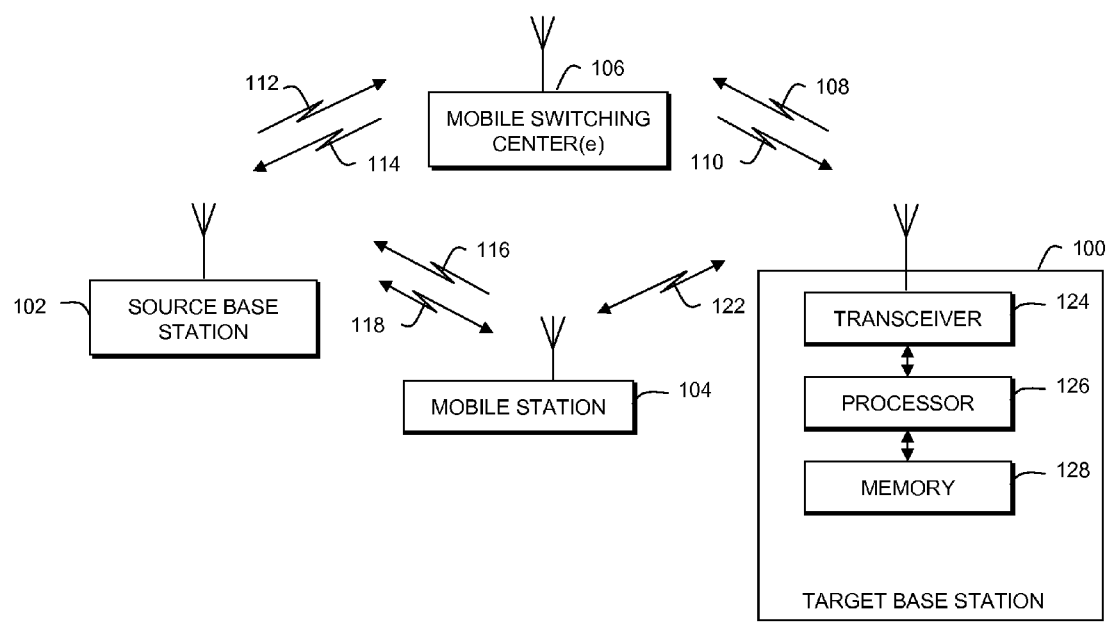
FIG. 1 is an example of a handoff in a communication network, in accordance with the present invention.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

The present invention provides a technique for a target base station to be informed about the Flex Duplex capabilities presently in use for the communication to be handed off. The present invention also addresses the Flex Duplex capabilities of the mobile station. In particular, the present invention proposes to add Flex Duplex information to Handoff Required and Handoff Request messages to let the target base station know the Flex Duplex channels that the source base station and the mobile station are using prior to the handoff. If the target base station can support the Flex Duplex channels that are in use prior to the handoff, then the target base station can choose to make the in-use setting its highest priority in responding to the handoff request. By re-using the in-use Flex Duplex setting, the handoff success probability is increased and the channel search time is decreased relative to a handoff in which the target base station has no knowledge of the in-use channel assignment.

Further, the Flex Duplex information can include the Flex Duplex capabilities of the mobile station. This additional information informs the target base station of the Flex Duplex channels that the mobile station can support (i.e., the mobile station capability set). The target based station can then select from the capability set of Flex Duplex channels in replying to the Handoff Request. In this way, the target base station only replies with a frequency pair in the capability set that the MS is capable of accepting in the handoff.

In the event that the FDC configuration cannot be supported, a fixed-channel configuration can be chosen by the target base station. As used herein "normal, non-flex, and fixed" channel configurations hold the same meaning.

The present invention includes the capability for the source BS to inform the target BS of the MS's Flex Duplex capability in A1 and A1p forward messages (e.g., Handoff Required, Handoff Request) or for the target BS to inform the source BS via reverse messages (e.g., Handoff Request Acknowledgement, Handoff Command). The present invention also includes the capability for the source BS to inform the target BS of the current Flex Duplex channel the MS is using. The present invention also includes the capability of the target BS to use the mobile Flex Duplex capability and current Flex Duplex channel received from the source BS in determining the Flex Duplex channel to be assigned to the MS. The present invention also includes the capability of assigning the Flex Duplex channel across different bands during hard handoff. That is, the forward link can be on a band that is different from the reverse link. The present invention also allows the target base station to allocate a fixed-configuration channel pair if no Flex Duplex configured channel can be chosen.

FIG. 1 illustrates a CDMA2000 rev. E (3GPP2 C.S0001-E v1.0 through C.S0005-E v1.0) or later cellular communication network, as described below for the present invention, including a source base station (SBS) 102, a target base station (TBS) 100, at least one mobile station (MS) 104, and a mobile switching center (MSC) 106, which can be a circuit-switched (i.e., MSC) or a packet-switched Mobile Switching Center emulation (i.e., MSCe). In this scenario, the TBS and MS are operable using Flex Duplex capability. The SBS may also be Flex Duplex operable. In the example, the MS 104 is initially in a call 118 with the SBS 102. The call 118 is preferably in Flex Duplex mode but may be in another mode (e.g., fixed-duplex). The MS enters a handoff condition for handing off the call to the TBS 100. After the handoff, the MS and TBS may be operating in Flex Duplex mode.

In handoff operation, the SBS 102 establishes the Flex Duplex capability of the MS 104. This information can be obtained 116 from the MS itself, or possibly from the MSC 106. The SBS 102 sends this Flex Duplex capability information 112 to the MSC 106, which forwards 110 this information to the TBS 100. Optionally, the information can also include the present operating Flex Duplex mode of the call 118. This information is received by the transceiver 124 and provided to the processor 126. The Flex Duplex capability information can then be stored in the memory 128 for future use.

The processor 126 uses the information to select an operating Flex Duplex channel pair to be used for communicating with the MS 104 after handoff. Preferably, the present operating Flex Duplex mode of the call 118 is given preference for the selection. However, a different Flex Duplex channel pair can be selected when the present operating Flex Duplex mode of the call 118 is considered unsuitable by the processor 126. The processor 126 then directs the transceiver 124 to send the selected Flex Duplex channel pair to the MS 104 by means of sending a message 108 with the selected Flex Duplex channel pair to the MSC 106 which then forwards this message 114 to the SBS 102, which then conveys the information to the MS in the call 118. Knowing the selected Flex Duplex channel pair, the MS and TBS 100 can configure themselves for the handoff, whereupon the handoff call 122 is then established between the TBS 100 and the MS 104.

In the event that FDC configuration cannot be supported, a normal channel configuration can be chosen by the TBS 100. The processor 126 then directs the transceiver 124 to send the selected normal channel pair to the MS 104 by means of sending a message 108 with the selected normal channel pair to the MSC 106 which then forwards this message 114 to the SBS 102, which then conveys the information to the MS 104 in the call 118. The method enables the TBS 100 to choose either FDC or fixed channel based on the mobile's FDC capability, the initial call 118 configurations, and the TBS 100 capability to support FDC.

Figure 2:
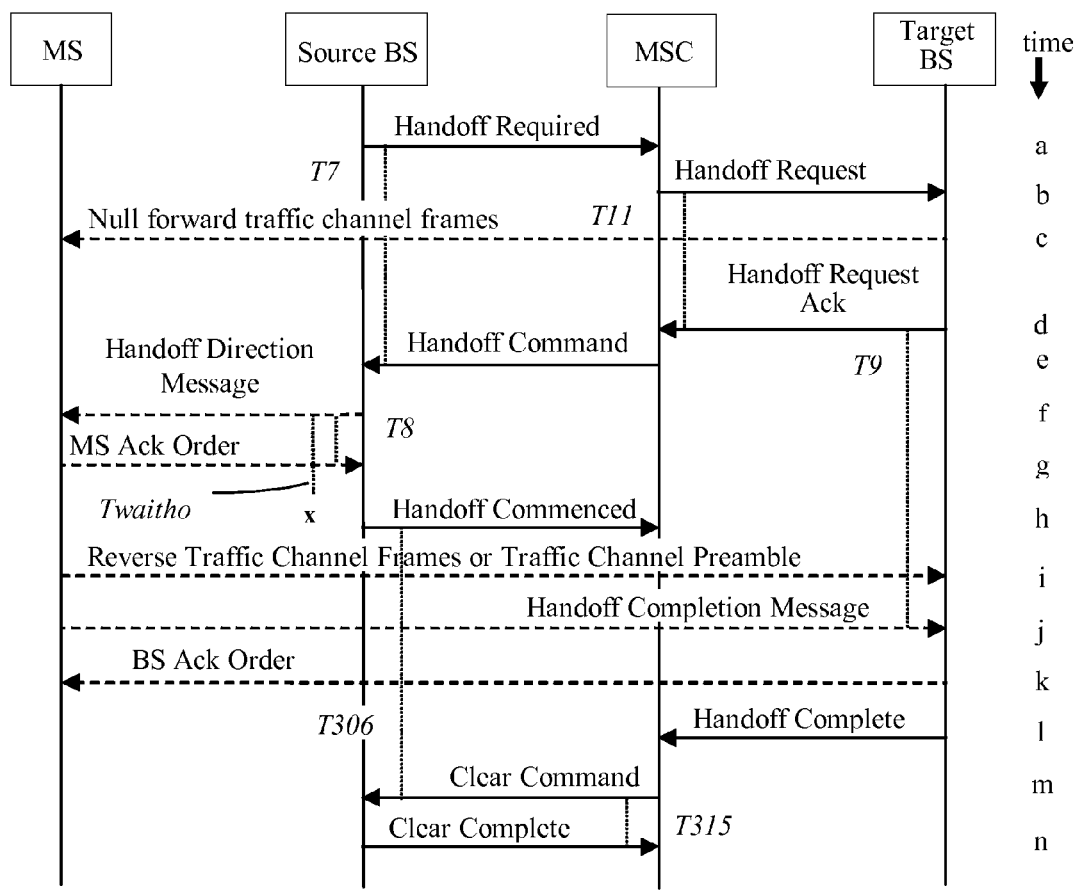
FIG. 2 is a flowchart of call control signaling, in accordance with a first embodiment of the present invention.

FIG. 2 illustrates a message flow for a successful hard handoff via A1 and A2 interfaces, in accordance with the present invention. This call flow assumes that the source BS and the target BS are under the control of a circuit-switched MSC.

In step a, based on an MS report that it crossed a network-specified threshold for signal strength or for other reasons, a source BS recommends a hard handoff to one or more cells in the domain of the target BS. The source BS sends a Handoff Required message with the list of cells to the MSC and starts timer T7. The Handoff Required message includes a prioritized list of information including CDMA channels (frequencies). This list can include currently in-use Flex Duplex channels (frequencies), in accordance with the present invention, the FDC capabilities of the MS, in accordance with the present invention, or even non-Flex Duplex channels (frequencies).

In step b, the MSC sends a Handoff Request message to the target BS with the IS-95 Channel Identity element or the IS-2000 Channel Identity element present, based on whether the MSC proceeds with a CDMA-CDMA handoff attempt and the corresponding IS-2000 or IS-95 Channel Identity element was present in the Handoff Required message. The MSC starts timer T11. In accordance with the present invention, the Handoff Request message includes the CDMA channels that are in-use for the present call. In the case of hard handoff for an asynchronous data/fax call, the Circuit Identity Code Extension element in the Handoff Request message indicates the Circuit Identity Code of the circuit to be connected to the SDU function at the target BS to support the A5 connection to the Inter-Working Function.

In step c, upon receipt of the Handoff Request message from the MSC, the target BS allocates appropriate radio resources as specified in the message and connects the call. As the Handoff Request message can have multiple cells specified, the target BS can also choose to set up multiple cells for the handoff request. The target BS sends null forward traffic channel frames to the MS, which, in accordance with the present invention, may be on the current FDC. In accordance with the present invention, the target BS decides which subset of the FDC information received from the source BS is compatible with the target base station FDC capabilities and replies to the handoff request with an FDC configuration or a prioritized list of FDC configurations that the target base station can support for a handoff. The target BS normally selects the FDC configuration that is in-use prior to handoff as the highest priority FDC configuration. In the event that FDC configuration cannot be supported, a fixed-channel configuration can be chosen by the target base station.

In step d, the target BS sends a Handoff Request Acknowledge message to the MSC and starts timer T9 to wait for arrival of the MS on its radio channel. The MSC stops timer T11 upon the receipt of this message. The first cell in the cell identifier list element of the message is treated as the new designated cell by the MSC. The change of designated cell occurs upon receipt of the Handoff Complete message. If the service option received in the Handoff Request message is not available at the target BS and the target BS selected a different service option for the handoff, then the target BS includes the service option it selected in the service configuration records. The target base station may include the Flex Duplex information. In accordance with the present invention, the target BS places high priority on using the flex duplex channel assignment that is in-use prior to the handoff.

In step e, the MSC prepares to switch the MS from the source BS to the target BS and sends a Handoff Command message to the source BS. The source BS stops timer T7. The MSC shall include in the Handoff Command message the service configuration records it received in the Handoff Request Ack message. The MSC may include the Flex Duplex information. In accordance with the present invention, the MSC places high priority on using the flex duplex channel assignment that is in-use prior to the handoff.

In step f, the source BS sends a handoff direction message (which may be a Handoff Direction Message, a General Handoff Direction Message, an Extended Handoff Direction Message, or a Universal Handoff Direction Message as appropriate) to the MS and starts timer T8. If the MS is allowed to return to the source BS, timer Twaitho is also started by the source BS.

In step g, the MS may acknowledge the handoff direction message by sending an MS Ack Order to the source BS. The source BS stops timer T8 upon receipt of this message. If the handoff direction message is sent using quick repeats, the source BS might not request an acknowledgment from the MS.

In step h, the source BS sends a Handoff Commenced message to the MSC to notify it that the MS has been ordered to move to the target BS channel. The source BS starts timer T306 to await the Clear Command message from the MSC. If timer Twaitho has been started, the source BS waits for that timer to expire before sending the Handoff Commenced message.

In step i, the MS sends reverse traffic channel frames or the traffic channel preamble to the target cell(s).

In step j, the MS sends a Handoff Completion Message to the target BS. The target BS stops timer T9.

In step k, the target BS sends the BS Ack Order to the MS over the air interface.

In step l, the target BS sends a Handoff Complete message to the MSC to notify it that the MS has successfully completed the hard handoff.

In step m, the MSC sends a Clear Command message to the source BS and starts timer T315. The source BS stops timer T306.

In step n, the source BS sends a Clear Complete message to the MSC to notify it that clearing has been accomplished. The MSC stops timer T315.

Figure 3:
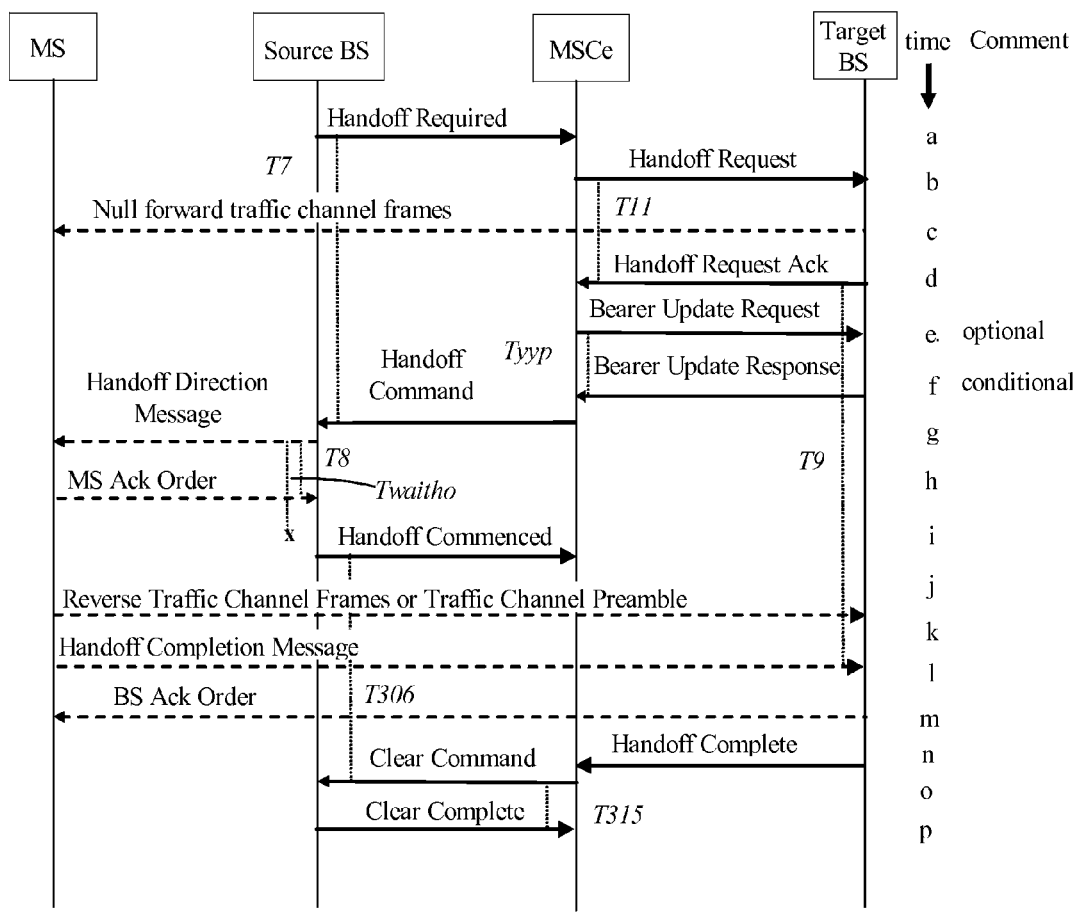
FIG. 3 is a flowchart of call control signaling, in accordance with a second embodiment of the present invention.

FIG. 3 illustrates a message flow for a successful hard handoff via A1p and A2p interfaces, in accordance with the present invention. This call flow assumes that the source BS and the target BS are under the control of an MSCe.

In step a, based on an MS report that it crossed a network-specified threshold for signal strength or for other reasons, a source BS recommends a hard handoff to one or more cells in the domain of the target BS. The source BS sends a Handoff Required message with the list of cells to the MSCe and starts timer T7. The Handoff Required message includes a prioritized list of information including CDMA channels (frequencies). This list can include currently in-use Flex Duplex channels (frequencies), in accordance with the present invention, the FDC capabilities of the MS, in accordance with the present invention, or even non-Flex Duplex channels (frequencies).

In step b, the MSCe sends a Handoff Request message to the target BS with the IS-95 Channel Identity element or the IS-2000 Channel Identity element present, based on whether the MSCe proceeds with a CDMA-CDMA handoff attempt and the corresponding IS-2000 or IS-95 Channel Identity element was present in the Handoff Required message. The Handoff Request message may also include the A2p bearer parameters containing the MGW address. The MSCe starts timer T11. In accordance with the present invention, the Handoff Request message includes the CDMA channels that are in-use for the present call.

In step c, upon receipt of the Handoff Request message from the MSCe, the target BS allocates appropriate radio resources as specified in the message and connects the call. As the Handoff Request message can have multiple cells specified, the target BS can also choose to set up multiple cells for the handoff request. The target BS sends null forward traffic channel frames to the MS, which, in accordance with the present invention, may be on the current FDC. In accordance with the present invention, the target BS decides which subset of the FDC information received from the source BS is compatible with the target base station FDC capabilities and replies to the handoff request with an FDC configuration or a prioritized list of FDC configurations that the target base station can support for a handoff. The target BS normally selects the FDC configuration that is in-use prior to handoff as the highest priority FDC configuration. In the event that FDC configuration cannot be supported, a fixed-channel configuration can be chosen by the target base station.

In step d, the target BS sends a Handoff Request Acknowledge message to the MSCe with the A2p bearer parameters containing the reserved bearer format(s) and the bearer address of the BS. The BS starts timer T9 to wait for arrival of the MS on its radio channel. The MSCe stops timer T11 upon the receipt of this message. The first cell in the cell identifier list element of the message is treated as the new designated cell by the MSCe. The change of designated cell occurs upon receipt of the Handoff Complete message. If the service option received in the Handoff Request message is not available at the target BS and the target BS selected a different service option for the handoff, then the target BS includes the service option it selected in the service configuration records. The target base station may include the Flex Duplex information. In accordance with the present invention, the target BS places high priority on using the flex duplex channel assignment that is in-use prior to the handoff.

In step e, the MSCe may send a Bearer Update Request message to the target BS. The Bearer Update Request message includes the A2p bearer parameters, which may contain the selected bearer format(s) and the MGW address. The MSCe starts timer Tyyp.

In step f, if a Bearer Update Request message was received, the target BS sends a Bearer Update Response message to the MSCe. Upon receipt of the Bearer Update Response message, the MSCe stops timer Tyyp.

In step g, the MSCe prepares to switch the MS from the source BS to the target BS and sends a Handoff Command message to the source BS. The Handoff Command message is sent only after the A2p bearer connection has been established with the target BS. The source BS stops timer T7. The MSCe includes in the Handoff Command message the service configuration records it received in the Handoff Request Ack message.

In step h, the source BS sends a Handoff Direction message (which may be a Handoff Direction Message, a General Handoff Direction Message, an Extended Handoff Direction Message, or a Universal Handoff Direction Message as appropriate) to the MS and starts timer T8. If the MS is allowed to return to the source BS, timer Twaitho is also started by the source BS.

In step i, the MS may acknowledge the handoff direction message by sending an MS Ack Order to the source BS. The source BS stops timer T8 upon receipt of this message.

In step j, the source BS sends a Handoff Commenced message to the MSCe to notify it that the MS has been ordered to move to the target BS channel. The source BS starts timer T306 to await the Clear Command message from the MSCe. If timer Twaitho has been started, the source BS waits for that timer to expire before sending the Handoff Commenced message.

In step k, the MS sends reverse traffic channel frames or the traffic channel preamble to the target cell(s).

In step l, the MS sends a Handoff Completion Message to the target BS. The target BS stops timer T9.

In step m, the target BS sends the BS Ack Order to the MS over the air interface.

In step n, the target BS sends a Handoff Complete message to the MSCe to notify it that the MS has successfully completed the hard handoff.

In step o, the MSCe sends a Clear Command message to the source BS and starts timer T315. The source BS stops timer T306.

In step p, the source BS sends a Clear Complete message to the MSCe to notify it that clearing has been accomplished. The MSCe stops timer T315.

It should be noted that the present invention could also be extended to soft/softer/fast handoff call flows. In addition, the MS's band class capability can be extended to indicate whether the MS supports FDC.

Referring to FIGS. 4 and 5, the present invention can be provided in a specific implementation of any one of a Handoff Required message, a Handoff Request message, a Handoff Request Acknowledge message, and a Handoff Command message in Octets n+6 through n+10, as shown in FIG. 4 or in Octets n+10 through n+14, as shown in FIG. 5. In FIG. 4, the FDC information is coded in the IS-2000 Channel Identity information element. In FIG. 5, the FDC information is coded in the IS-2000 Channel Identity 3X information element. It should be recognized that other octets, elements, or messages could be used to carry the FDC information.

Referring to FIG. 6, the present invention can be provided in a specific implementation of an IS-2000 Channel Identity 3X information element and IS-2000 Channel Identity information element in Octets 12 through 16, as shown. It should be recognized that other octets, elements, or messages could be used to carry the FDC information. In these cases, the FDC Length field contains the number of bytes following this field as a binary number for the FDC information. If this field is set to zero, then the FDC Band Class, Forward Channel Frequency, and Reverse Channel Frequency information are omitted. The FDC Band Class field contains the band class information for the flex duplex channel provided by the target BS. The FDC Forward Channel Frequency field contains the forward channel information for the flex duplex channel provided by the target BS. The FDC Reverse Channel Frequency field contains the reverse channel information for the flex duplex channel provided by the target BS. (Refer to 3GPP2 C.S0005-E v2.0).

Figure 7:
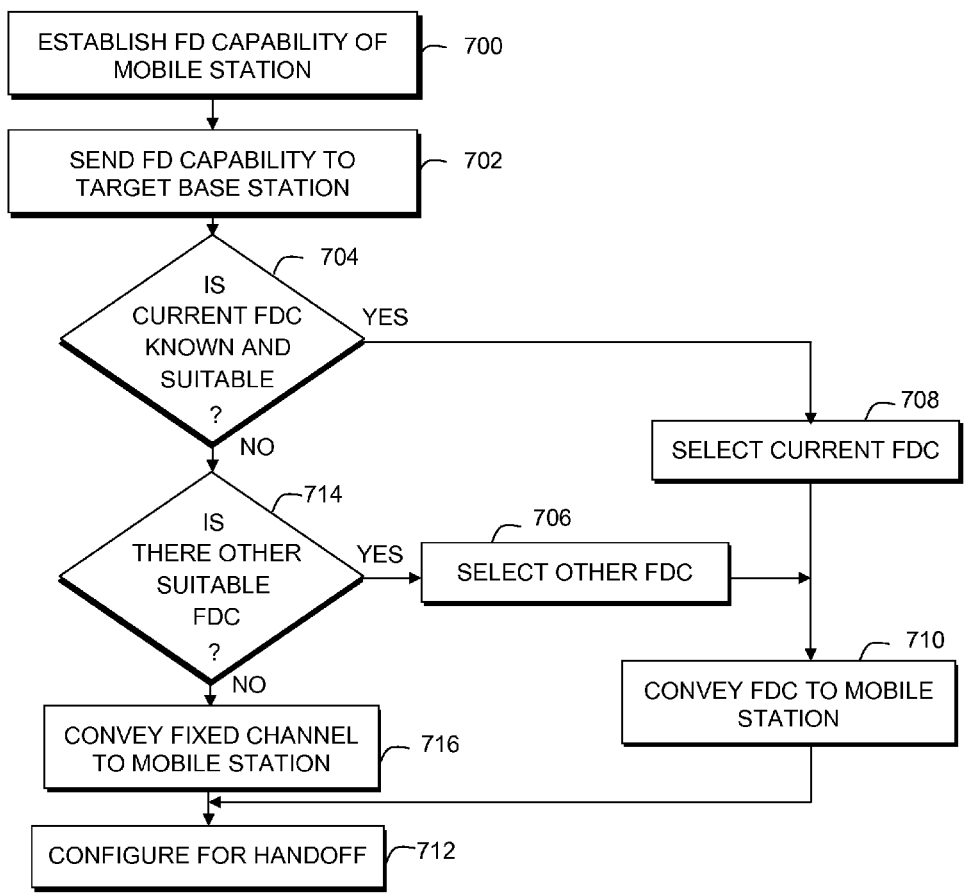
FIG. 7 illustrates a method, in accordance with the present invention.

FIG. 7 shows a mobile station hard handoff from a source base station to a target base station of a Flex Duplex call in a CDMA2000 wireless communication network. The method includes an optional first step 700 of establishing Flex Duplex capabilities of the mobile station. This information can be known by the source base station or obtained from the mobile station, mobile switching center, or other network entity.

A next step 702 includes sending the Flex Duplex capabilities of the mobile station to the target base station. In particular, this includes sending the Flex Duplex capabilities in a Handoff Required message from the source base station to the mobile switching center and in a Handoff Request message from the mobile switching center to the target base station. The Flex Duplex capabilities can be beyond what the source base station is currently using for the call. Optionally, the message can include a Flex Duplex or fixed-channel pair that is currently being used in the call to be handed off.

A next step includes selecting a Flex Duplex channel pair to use for the handoff call. Specifically, if the Flex Duplex channel pair currently being used is known 704 to the target base station, this currently used Flex Duplex channel pair could be given preference 708 in determining the Flex Duplex channel pair to be used for the handoff call. The target base station can then perform channel allocation considering the current Flex Duplex channel used and the mobile station's Flex Duplex capability. However, if other Flex Duplex channel pairs are suitable 714, other Flex Duplex capabilities of the mobile station can be selected 706 when the current Flex Duplex channel pair is not considered suitable 704 for the handoff. If no Flex Duplex channel pairs are suitable 714, then a fixed-duplex channel pair is conveyed 716 to the mobile station. A Handoff Request Acknowledgement message from the target base station to the mobile switching center and a Handoff Command message from the mobile switching center to the source base station is sent 710 indicating the selected Flex Duplex channel pair to be used for the handoff call. This information is conveyed 710 by the source base station to the mobile station.

Given the selected Flex Duplex channel pair, the target base station and mobile station can configure 712 themselves for the handoff call.

It should be recognized that the channel configuration can be changed from fixed-channel configuration used at the source base station to Flex Duplex or fixed-channel configuration used at the target base station. Conversely, the channel configuration can be changed from Flex Duplex channel configuration used at the source base station to fixed or Flex Duplex channel configuration used at the target base station.

In operation, the present invention provides a specific algorithm for the source BS to determine what information to send to the target BS in the Handoff Required message. Noting that the target BS forward and reverse channel capabilities seldom change, then time and bandwidth in the source BS to target BS direction can be saved by sending only the current forward and reverse channel numbers. This algorithm is:

```
if the target BS is likely to be able to support the current channel numbers, then
    the source BS sends the current channel numbers to the target BS so that the
    target BS can simply confirm that it can presently support the current channel
    numbers;
otherwise:
        if the target BS is likely to support one or more of the MS channel
            capabilities, then the source BS sends only the MS channel numbers
            that the target BS is likely to be able to support;
        otherwise:
                the source BS sends neither the current channel numbers nor the
                    MS channel capabilities to the target BS so that the target BS
                    responds with all of its channel capabilities. (Note: It is not
                    preferred to fail the handoff here because failing a handoff at
                    this step could eventually fail all handoffs. Assuming the BS
                    estimate is good, maybe the source BS does not even send the
                    Handoff Request message because the handoff is likely to fail.
                    However, if the target BS were to, for example, be upgraded,
                    then the source BS would need to update its estimate of the
                    target BS channel-number capabilities.);
        end if
end if
```

The present invention also provides a specific algorithm for the target BS that minimizes handoff time and backhaul bandwidth in the target BS to source BS direction. This algorithm is:

```
if the target BS knows the current forward and reverse channel number, then:
    if the target BS can support the current forward and reverse channel
        numbers, then:
            the target BS replies with the current forward and reverse channel
                numbers;
    else if the target BS knows the MS forward and reverse channel
        capabilities, then:
            if the target BS can support some of the MS forward and reverse
                channels, then:
                    the target BS replies with the subset of MS forward and
                        reverse channels that the target BS can support;
            otherwise (the target BS cannot support any of the MS channels)
                    the target BS rejects the handoff;
            end if
    otherwise:
            the target BS replies with its forward and reverse channel
                capabilities;
    end if
otherwise:
    the target BS replies with its forward and reverse channel capabilities;
end if
```

If the source BS does not know the target BS capabilities, then the source BS should send the current call forward and reverse channels numbers as well as the MS channel number capabilities.

With the present invention, the necessary mobile capabilities information and current flex duplex channel information can be known to the target BS. The target BS then would make an informed decision when it comes to channel assignment. Without such information, the target could mistakenly assign the MS to a Flex Duplex channel that the MS is not capability of supporting, therefore causing hard handoff failures. Or the target BS could assign a Flex Duplex channel that is not favorable for hard handoff, therefore causing hard handoff delay or even failed hard handoff if RF conditions are not favorable. Therefore, the target base station has the option of falling back to select a fixed channel or even of rejecting the handoff if there is no other possible way to support the handoff.

Advantageously, the present invention shortens the CDMA-to-CDMA handoff time when using Flex Duplex because the target base station is informed of the forward and reverse channel assignment that is in-use prior to the handoff. As a result, time is saved by not sending target capabilities to the source base station that are unlikely to be used during a handoff. In addition, time is saved by preventing the exchange of information to the source base station informing it of the target base station's capability that has no chance for success. In this way, the target base station can determine, after receiving the handoff request message, that it does not support the handoff configuration of the currently in-use call and can immediately choose to reject the handoff request or back down to fixed Duplex channel assignment. In addition, the CDMA-to-CDMA handoff success probability is increased.

In view of the many possible embodiments to which the principles of the present invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

We claim:

1. A method for mobile station hard handoff from a source base station to a target base station of a Flex Duplex call in a CDMA wireless communication network, the method comprising the steps of:
   establishing Flex Duplex capabilities of the mobile station;
   sending the Flex Duplex capabilities of the mobile station to the target base station; and
   configuring the mobile station and the target base station for the handoff of the call in response to the Flex Duplex capabilities;
   wherein the sending step comprises sending a Flex Duplex channel pair that is currently being used; and
   wherein the configuring step gives preference to this Flex Duplex channel pair.

2. The method of claim 1:
   wherein the sending step comprises sending a fixed-channel pair currently used with the mobile station at the source base station; and
   wherein the configuring step configures a Flex Duplex channel configuration at the target base station.

3. The method of claim 1:
   wherein the sending step comprises sending a Flex Duplex channel pair currently used with the mobile station at the source base station; and
   wherein the configuring step configures a fixed-channel configuration at the target base station.

4. The method of claim 1 wherein the configuring step comprises:
   the target base station selecting a fixed-duplex channel pair to use for the handoff call; and
   sending a message indicating the selected fixed-duplex channel pair to be used for the handoff call.

5. The method of claim 1 wherein the sending step comprises sending the Flex Duplex capabilities in a Handoff Required message from the source base station to a mobile switching center and in a Handoff Request message from the mobile switching center to the target base station.

6. The method of claim 1 wherein the Flex Duplex capabilities are beyond what the source base station is currently using for the call.

7. The method of claim 1 wherein the configuring step comprises:
   the target base station selecting a Flex Duplex channel pair to use for the handoff call; and
   sending a message indicating the selected Flex Duplex channel pair to be used for the handoff call.

8. The method of claim 7 wherein the message comprises a Handoff Request Acknowledgement message sent from the target base station to the mobile switching center and a Handoff Command message sent from the mobile switching center to the source base station.

9. The method of claim 8 wherein the message further comprises a message from the source base station to the mobile station conveying the selected Flex Duplex channel pair to use for the handoff call.

10. The method of claim 1 wherein the configuring step considers another Flex Duplex capability of the mobile station when the current Flex Duplex channel pair is not considered suitable for the handoff.

* * * * *